(12) United States Patent
Roberts et al.

(10) Patent No.: US 9,635,435 B1
(45) Date of Patent: Apr. 25, 2017

(54) ENHANCED CONTENT ACCESS SYSTEMS AND METHODS

(75) Inventors: Brian Roberts, Frisco, TX (US); Heath Stallings, Grapevine, TX (US); Don Relyea, Dallas, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 427 days.

(21) Appl. No.: 11/474,995

(22) Filed: Jun. 27, 2006

(51) Int. Cl.
| H04N 7/025 | (2006.01) |
| H04N 21/80 | (2011.01) |
| H04N 21/60 | (2011.01) |
| H04N 5/445 | (2011.01) |

(52) U.S. Cl.
CPC ............ *H04N 21/80* (2013.01); *H04N 21/60* (2013.01); *H04N 2005/44547* (2013.01)

(58) Field of Classification Search
USPC ..... 725/86, 87, 91, 100, 103, 104, 109, 110, 725/112
See application file for complete search history.

(56) References Cited

U.S. PATENT DOCUMENTS

| 6,240,401 | B1* | 5/2001 | Oren ................. G06Q 20/102 348/E7.063 |
| 6,539,548 | B1* | 3/2003 | Hendricks ............ H04H 20/42 348/E5.002 |
| 6,564,380 | B1* | 5/2003 | Murphy ................ H04N 7/147 348/207.11 |
| 2002/0016972 | A1* | 2/2002 | Ogawa ................. G06Q 30/02 725/133 |
| 2002/0023268 | A1* | 2/2002 | LaRocca ........... G06Q 30/0207 725/87 |
| 2003/0066091 | A1* | 4/2003 | Lord ................... H04N 7/17318 725/135 |
| 2004/0226042 | A1* | 11/2004 | Ellis ................... H04N 5/44543 725/43 |
| 2006/0112336 | A1* | 5/2006 | Gewickey ........ H04N 21/23614 715/716 |
| 2006/0123451 | A1* | 6/2006 | Preisman ........... H04N 7/17318 725/86 |
| 2006/0223518 | A1* | 10/2006 | Haney ........................... 455/420 |
| 2007/0157249 | A1* | 7/2007 | Cordray ............... G06F 3/0482 725/58 |
| 2008/0184308 | A1* | 7/2008 | Herrington et al. ........... 725/43 |

* cited by examiner

*Primary Examiner* — Nathan Flynn
*Assistant Examiner* — Christine Kurien

(57) ABSTRACT

In one of many possible embodiments, a system includes a media content processing subsystem and a network entity. The media content processing subsystem is configured to transmit to the network entity a request to access enhanced content corresponding to a media content instance that is selected by a user of the media content processing subsystem. The network entity is configured to process the request and provide a user with access to the enhanced content via the processing subsystem.

29 Claims, 12 Drawing Sheets

ENHANCED CONTENT ACCESS SYSTEMS AND METHODS

BACKGROUND INFORMATION

The advent of computers, interactive electronic communication, the Internet, and other advances in the digital realm of consumer electronics have resulted in a great variety of programming, recording, and viewing options for users who view media content such as television programs. In implementing such options, the set-top box ("STB") has become an important computing device for accessing media content services and the media content within those services. In addition to supporting traditional analog broadcast video functionality, STBs also support an increasing number of two-way digital services such as video-on-demand and personal video recording.

An STB is typically connected to a cable or satellite, or generally, a subscriber television system, and includes hardware and software necessary to provide the functionality of the subscriber television system. Conventional STBs include a processor, communication components, and memory and are connected to a television or other display device, such as a personal computer. While many STBs are stand-alone devices that are externally connected to a television, an STB and/or its functionality may be integrated into a television or personal computer or even into an audio device such as a programmable radio, as will be appreciated by those of ordinary skill in the art.

An STB is usually configured to provide users with a large number and variety of media content choices. For example, a user may choose to view a variety of television programs, pay-per-view services, video-on-demand programming, Internet services, and audio programming via an STB.

As mentioned, an STB may also include a personal video recording ("PVR") application that allows a user to temporarily and/or permanently record selected media content to a storage device. Such recording functionality enables a user to view media content in "trick play," or non-linear, modes. Trick play modes include, but are not limited to, slow motion, fast motion, reverse play, fast forward play, instant replay, jumping, pausing of live broadcast, and scanning. To facilitate trick play modes, the media content is buffered or stored in a temporary memory buffer, often called a live cache buffer, so that it may be replayed non-linearly.

The ability to buffer live broadcasts has had a significant impact on the advertising industry. In the past, the basic business model for broadcast television programming has been free or low cost distribution of media content, subsidized by the insertion of commercials. However, PVRs allow users to easily skip many of these commercials.

In response, broadcast television and other media content providers have been forced to turn to other methods of generating revenue. For example, some media content providers have entered into "product placement" agreements with advertisers, where products are purposely included as part of the programming. Although product placement provides exposure to products, its effect is limited by the inability to include detailed descriptions of the products and/or discussion of the benefits of the products.

Other revenue generating techniques used by media content providers have also proven ineffective or undesirable. Accordingly, current revenue generating techniques are being rendered more and more ineffective as the number of PVR users increases.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Figure 1:
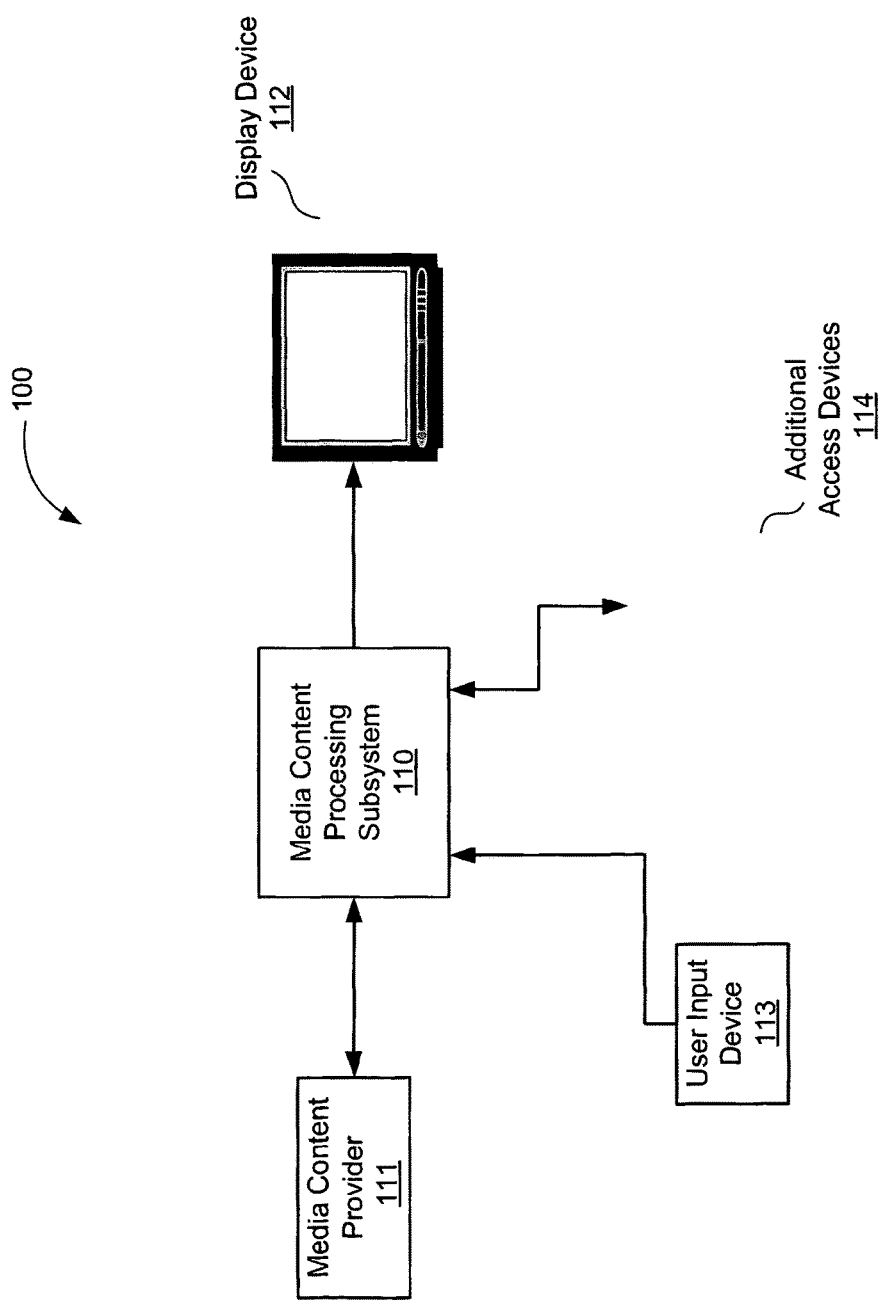
FIG. 1 illustrates an example of a media content access system, according to an embodiment.

Preferred exemplary systems and methods for providing a user with access to enhanced content corresponding to a media content instance are described herein. As used herein, the term "media content instance" will be used to refer generally to any television program, on demand program, pay-per-view program, broadcast media program, commercial, advertisement, video, movie, song, photograph, or any segment (e.g., a frame) of these or other forms of media content that may be experienced or viewed by a user.

The exemplary systems and methods described herein enable a user to access enhanced content related to a particular media content instance. As used herein, the term "enhanced content" will be used to refer to media content, information, and/or functionality related to a particular media content instance. In certain embodiments, the enhanced content may be accessed by a user if the user pays for such access. For example, a user may purchase the privilege to view or otherwise access enhanced content such as, but not limited to, episodes related to the media content instance on demand, new episodes related to the media content instance before they are broadcast to the public, unaired portions of the media content instance (e.g., branching scenes and alternative endings), unaired bonus footage and outtakes of the media content instance, production notes, photographs, interviews with the cast and crew, video chats with cast or crew, special offers for merchandise related to the media content instance, advertiser content, discussion forums related to the media content instance, promotions, contests, audio media related to the media content instance (e.g., soundtracks and features songs), and/or any other content related to the media content instance.

In some examples, a user may purchase or otherwise obtain an "access pass" corresponding to a particular media content instance and thereby access enhanced content that may not be available to other users or viewers who have not purchased similar access passes. As used herein, the term "access pass" will be used to refer to any means for facilitating access to enhanced content that may not be otherwise available to a user. For example, the access pass may include a code, password, decryption key, data module, network cookie, or any other hardware and/or software entity that enables access to the enhanced content. Hence, when a user purchases an access pass for a particular media content instance, that user in essence purchases the right to view or otherwise access enhanced content related to the media content instance. It will be recognized that in some examples, a user may obtain an access pass in a manner other than by purchasing the access pass. For example, a user may obtain an access pass by redeeming one or more rewards points, providing a promotion code, etc. However, for illustrative purposes, it will be assumed in the examples given herein that access passes are purchased.

In certain embodiments, a media content processing subsystem, such as a set-top box, is configured to communicate with a network entity, such as a media content provider server. A user may transmit to the processing subsystem a request to purchase an access pass that corresponds to a particular media content instance. The processing subsystem may then transmit data representative of the request to the network entity, which processes the request and charges a purchase price of the access pass to an account associated with the user. The network entity may then transmit the access pass to the processing subsystem. The user may then access the enhanced content via the processing subsystem. For example, the user may access the enhanced content by using one or more graphical user interfaces provided by the processing subsystem.

The systems and methods described herein may be used to supply media content consumers with enhanced content that may not be accessible via traditional television programming. For example, the systems and methods may be used by a media content provider to provide specific customers with media content that is tailored to their particular desires. Moreover, the systems and methods described herein may facilitate more effective advertising and may be used to increase revenue for media content providers. Users also benefit from the systems and methods described herein by being able to easily access enhanced content that is related to a particular media content instance.

Components and functions of exemplary embodiments of enhanced content access systems and methods will now be described in more detail.

II. Exemplary System View

FIG. 1 illustrates an example of a media content access system 100, according to one embodiment. Media content access system may take many different forms and include multiple and/or alternate components and facilities. Examples of such multiple/alternate components and facilities are reflected in commonly-assigned patent applications entitled "Snippet Access Systems and Methods" to Roberts, et al. (Ser. No. 11/500,208), and entitled "Media Content Access Systems and Methods" to Roberts, et al, (Ser. No. 11/474,992), each of which being filed on the same day as the present application, and each of which incorporated herein by reference in their respective entireties.

As shown in FIG. 1, a media content processing subsystem 110 is configured to communicate with and receive a data stream (i.e., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, Digital Subscriber Line ("DSL") networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies or combinations thereof.

The media content processing subsystem 110 is configured to process the media content stream provided by the media content provider 111 and provide a signal to a display device 112 so that the display device 112 may display the media content. As will be described in more detail below, the media content processing subsystem 110 may be controlled by a user input device 113 and/or a number of additional access devices 114.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to, television programs, pay-per-view services, video-on-demand programming, Internet services, DVD content, and audio programming.

Figure 2:
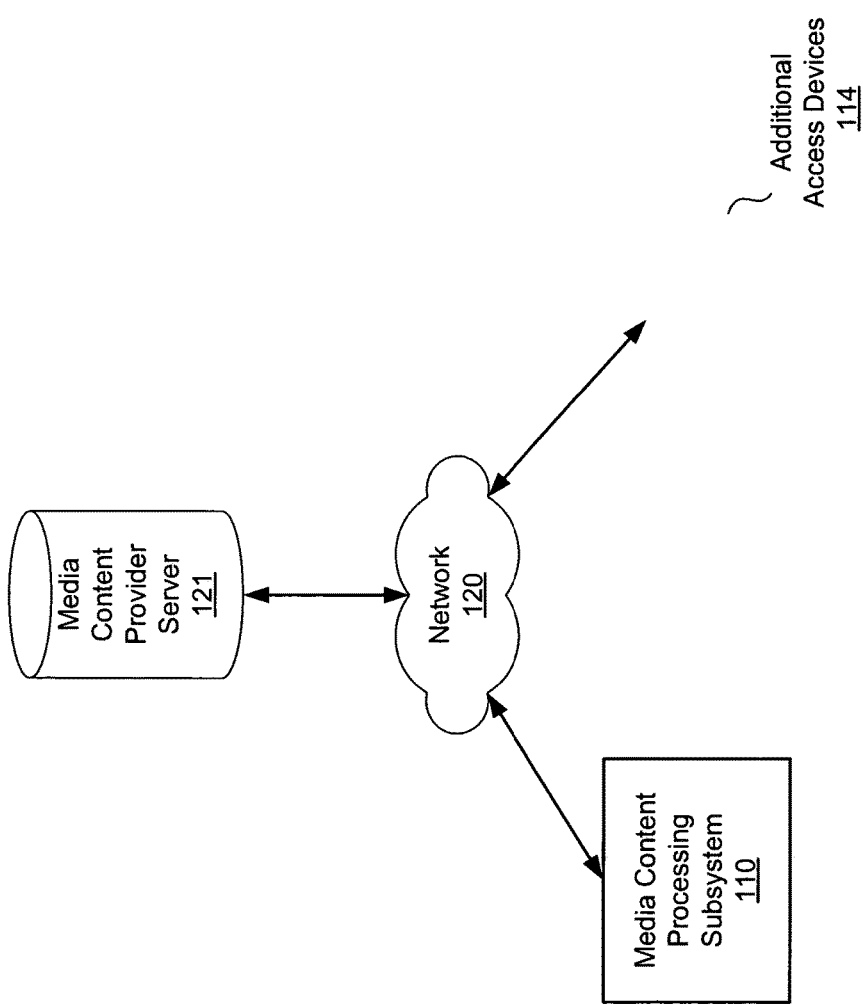
FIG. 2 is an illustration of an exemplary media content provider network, according to an embodiment.

An exemplary media content provider 111 includes a media content provider server 121, as shown in FIG. 2. FIG. 2 is an illustration of an exemplary media content provider network. As shown in FIG. 2, the media content provider server 121, media content processing subsystem 110, one or more of the additional access devices 114, and/or any other network entity may be configured to communicate one with another via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 and/or one or more of the additional access devices 114 may be connected directly to the media content provider server 121.

B. Display Device

As mentioned, the processing subsystem 110 may be coupled to a display device 112 that is configured to display or play the media content. The display device 112 may include, but is not limited to, a television, computer monitor, handheld device, or any other device configured to display or play the media content.

C. Media Content Processing Subsystem

Figure 3:
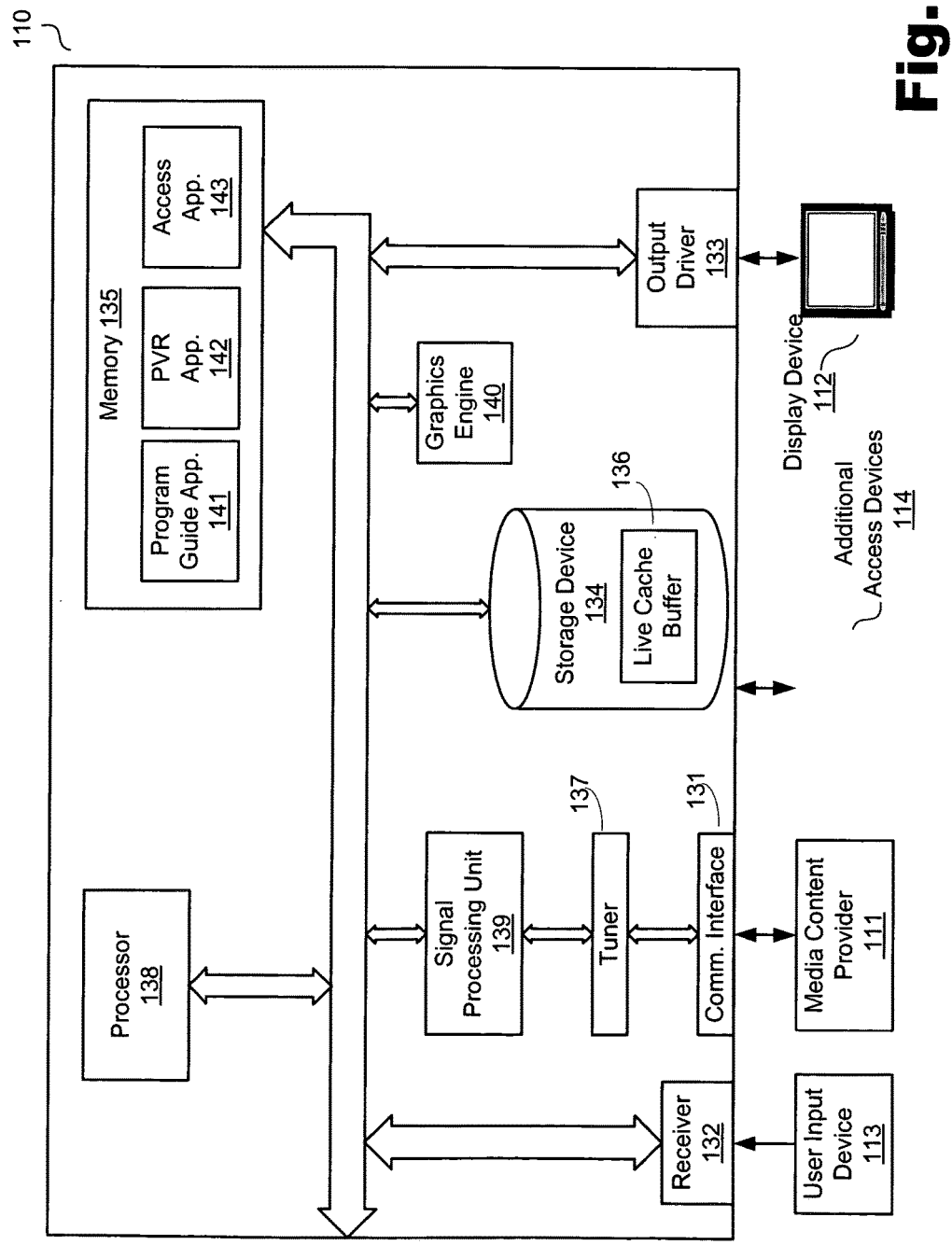
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible user terminals and/or receivers that are configured to process digital and/or analog media content. Hence, an exemplary processing subsystem 110 may include, but is not limited to, a set-top box, home communication terminal ("HCT"), digital home communication terminal ("DHCT"), stand-alone personal video recorder ("PVR"), digital video disc ("DVD") player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the Unix operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface unit 131 configured to receive media content from the media content provider 111. The processing subsystem 110 may also include a receiver 132 configured to receive input commands from a user input device 113. The user input device 113 may include, for example, a remote control, keyboard, or any other suitable input device and may be configured to communicate with the receiver 132 via an IR link, electrical connection, or any other suitable communication link.

Figure 4:
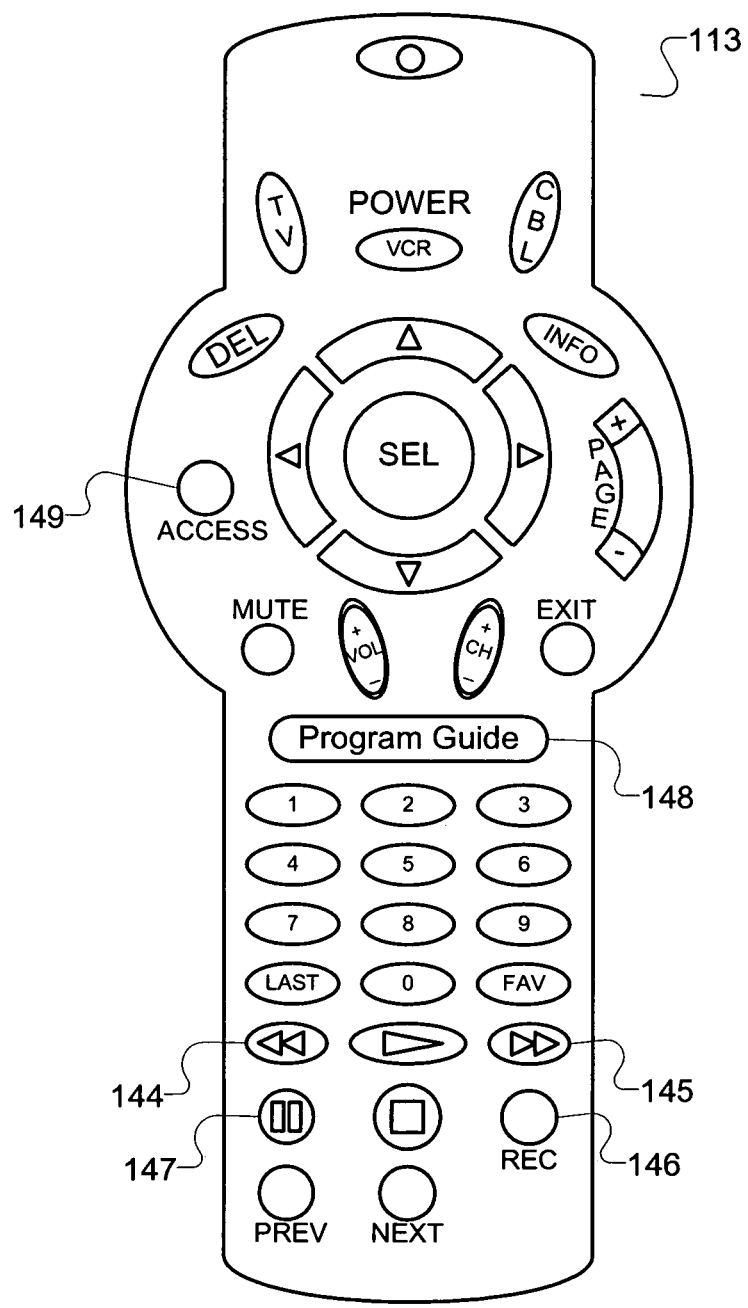
FIG. 4 illustrates an exemplary remote control user input device, according to an embodiment.

An exemplary remote control user input device 113 is illustrated in FIG. 4. In some examples, the input device 113 may be configured to enable a user to control viewing options of the media content. For example, rewind 144 and fast-forward buttons 145 enable a user to access different scenes or frames within media content stored in a live cache buffer 136. A record button 146 may also be included which enables the user to designate as permanently recorded any media content instance buffered in the live cache buffer 136. A pause button 147 may enable the user to pause a media content instance. A program guide button 148 may be configured to evoke the display of a program guide on the display device 112.

An access button 149, as will be described in more detail below, may also be included to provide the user with access to enhanced content corresponding to a particular media content instance. It will be recognized that the input device 113 shown in FIG. 4 is merely illustrative of the many different types of user input devices that may be used in connection with the present systems and methods.

Returning to FIG. 3, a number of additional access devices 114 may also be configured to communicate with the processing subsystem 110. These access devices 114 may include, but are not limited to, personal computers and mobile devices (e.g., laptops, personal digital assistants ("PDAs"), cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. In addition, enhanced content related to a particular media content instance may also be accessed via one or more of the additional access devices 114. It will be recognized that the additional access devices 114 may also be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory ("RAM"), dynamic RAM ("DRAM"), or a combination thereof. In some examples, as will be described in more detail below, various applications (e.g., a PVR application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. As will be described in more detail below, media content data may be temporarily stored in the live cache buffer 136 to facilitate viewing of the media content in one or more trick play modes.

3. Tuner

Tuner 137 is configured to tune to a particular television channel, stream, address, frequency or other carrier in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

The processing subsystem 110 may also include a graphics engine 140 configured to generate graphics that are to be displayed by the display device 112. The graphics may include graphical user interfaces ("GUIs") such as, but not limited to, a program guide, a progress bar, and other graphics.

5. Application Clients

Returning to FIG. 3, one or more applications 141-143 residing within the processing subsystem 110 may be executed upon initiation by a user of the processing subsystem 110. The applications 141-143, or application clients, may reside in memory 135 or in any other area of the processing subsystem 110 and be executed by the processor 138.

As shown in FIG. 3, one of the applications may be a program guide application 141 configured to generate a program guide that is displayed on the display device 112. An exemplary program guide includes a GUI that performs various functions including allowing a user to select and view program information associated with various media content instances.

The processing subsystem 110 may also include a personal video recording ("PVR") application 142. A PVR application is also referred to as a digital video recording ("DVR") application. As used herein and in the appended claims, unless otherwise specifically denoted, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 142 may also provide for media content recording functionality by enabling the temporary and/or permanent recording of media content to the storage device 134.

In some examples, the PVR application 142 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 142 is integrated into the processing subsystem 110 for illustrative purposes only.

Figure 5:
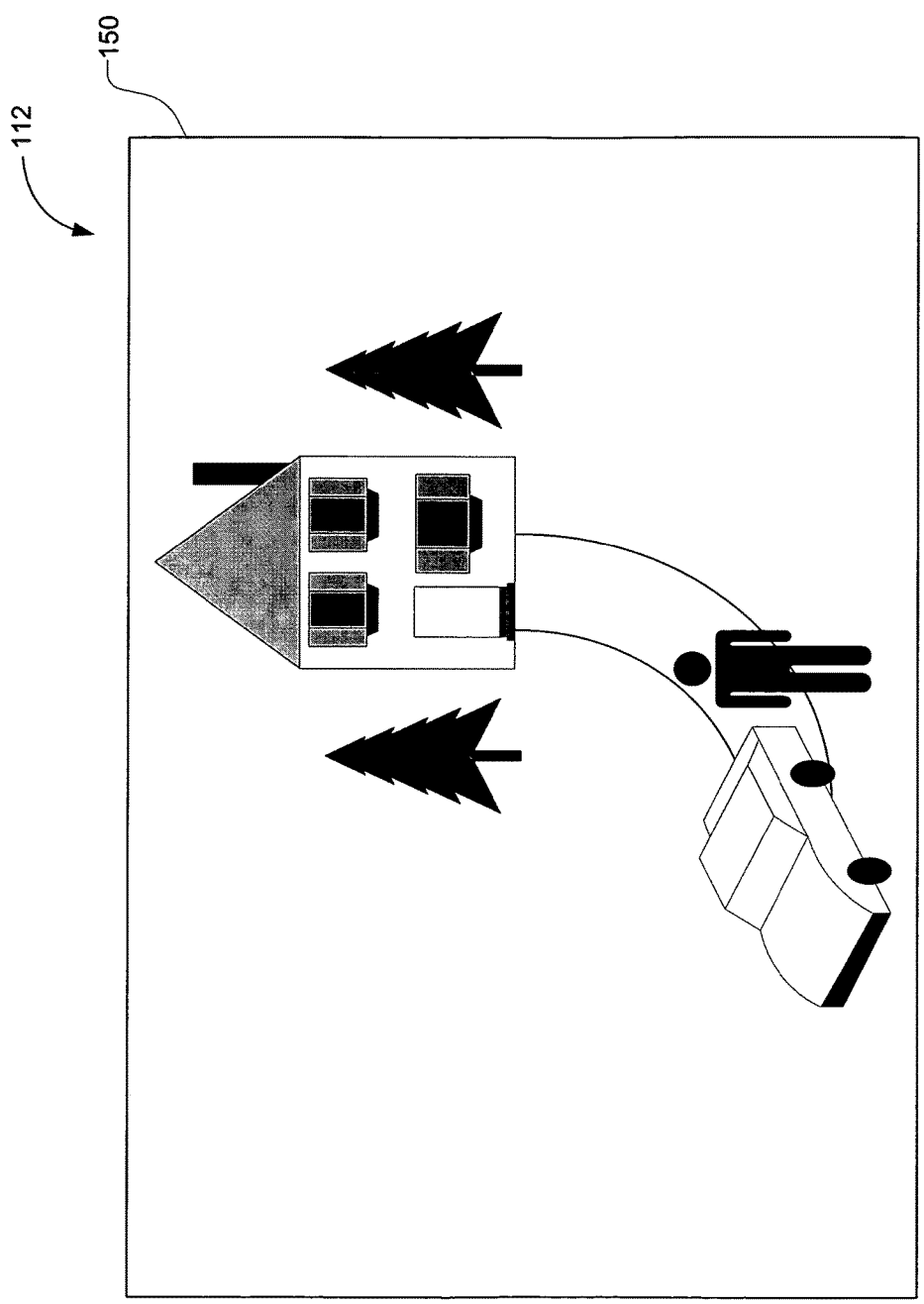
FIG. 5 illustrates a viewing screen of an exemplary display device with a particular scene or frame of a media content instance displayed thereon, according to an embodiment.

The processing subsystem 110 may also include an access application 143, which may be used by a user to access enhanced content related to a particular media content instance by purchasing an access pass. To facilitate an understanding of the access application 143, an exemplary media content scene is shown in FIG. 5. FIG. 5 illustrates a viewing screen 150 of an exemplary display device 112 with a particular scene or frame of a media content instance displayed thereon.

In some instances, a user may desire to access enhanced content associated with the particular media content instance being displayed by the display device 112. For example, if the media content instance shown in FIG. 5 is a television program, the user may desire to view extended episodes of the program, additional episodes of the program, alternative endings, unaired bonus footage, outtakes, production notes, photographs, interviews with the cast and crew, and/or any other additional media content related to the program. The user may additionally or alternatively desire to access and/or receive via email advertising content and offers related to the television program being shown. Additional or alternative examples of enhanced content related to the television program that may be accessed by a user include, but are not limited to, video chats with the producers, cast members, and writers; discussion forums related to the program; and contests related to the program.

Accordingly, in some embodiments, a user may purchase an access pass using the access application 143 to access the desired enhanced content. For example, the user may purchase an access pass corresponding to the media content instance shown in FIG. 5 to access enhanced content related therewith.

In some examples, the user may purchase an access pass simply by pressing a button that may be included on the input device 113. For example, the user may press the access button 149 shown on the user input device 113 of FIG. 4 to purchase an access pass. It will be recognized that additional or alternative methods may be used to purchase an access pass.

Upon pressing the access button 149, the processing subsystem 110 may be configured to automatically transmit a request to the media content provider server 121 or some other location on the network 120 to purchase an access pass corresponding to the media content instance currently being displayed by the display device 112. The media content provider server 121 may then process the request, charge an account associated with the user, and issue the access pass to the user. The user may then have access to enhanced content related to the media content instance.

Figure 6:
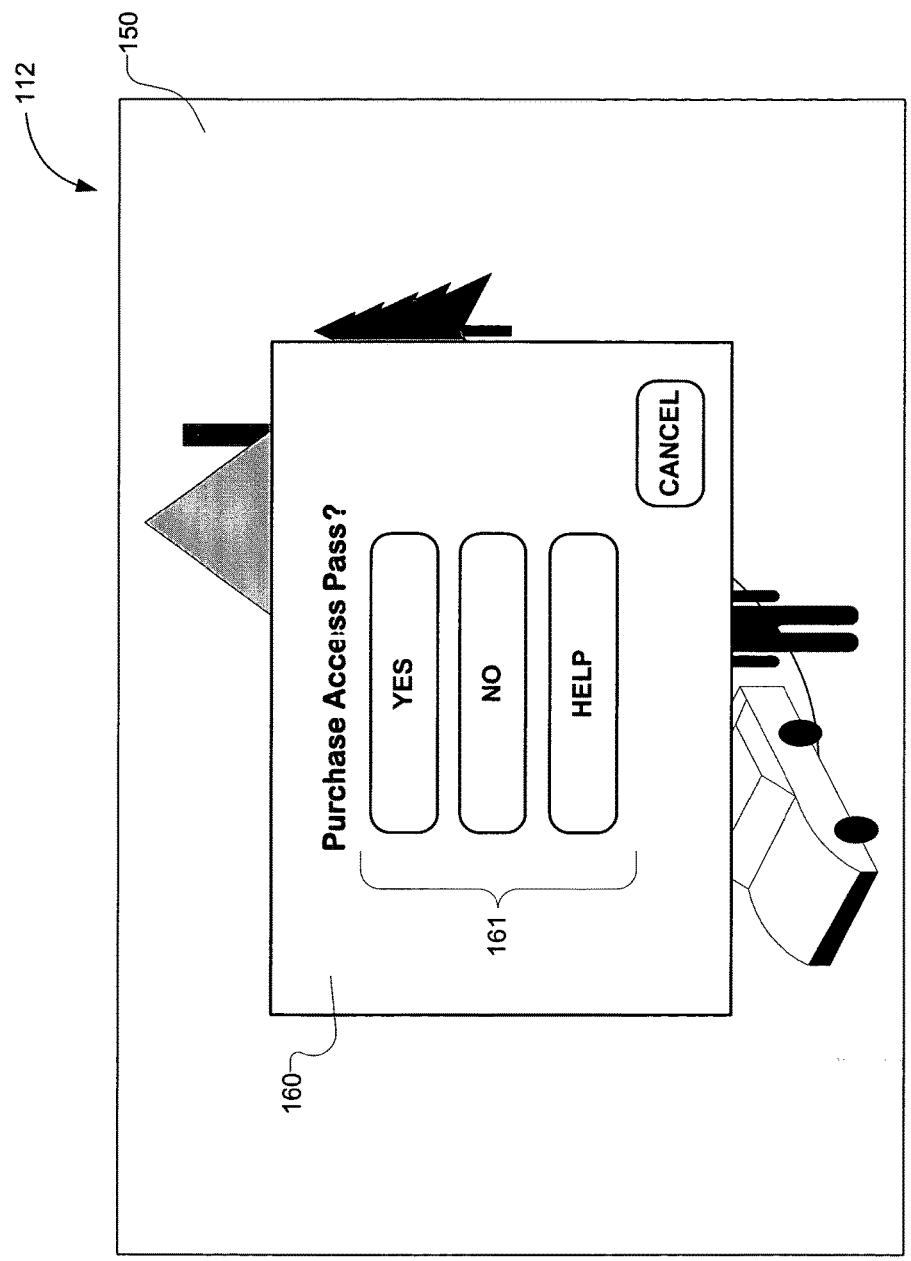
FIG. 6 illustrates an exemplary graphical user interface ("GUI") that may be displayed to facilitate the purchase of an access pass corresponding to a media content instance, according to an embodiment.

Alternatively, upon pressing the access button 149, the processing subsystem 110 may be configured to generate one or more GUIs that are configured to facilitate the purchase of an access pass corresponding to a particular media content instance that is being displayed by the display device 112. For example, FIG. 6 illustrates an exemplary GUI 160 that may be displayed to facilitate the purchase of an access pass corresponding to the media content instance 150. It will be recognized that the GUI 160 of FIG. 6 is merely illustrative of the many different types and layouts of GUIs that may be used to facilitate the purchase of an access pass.

As shown in FIG. 6, a user may be initially presented with a number of different options 161. For example, the user may select "YES" to purchase an access pass. Alternatively, the user may select "NO" to cancel the transaction and return to viewing the media content instance 150. A "HELP" feature may alternatively be selected. The "HELP" feature may include descriptive information regarding the access pass and/or enhanced content, pricing information, instructions as to how to purchase an access pass, and/or any other information as may serve a particular application.

Figure 7:
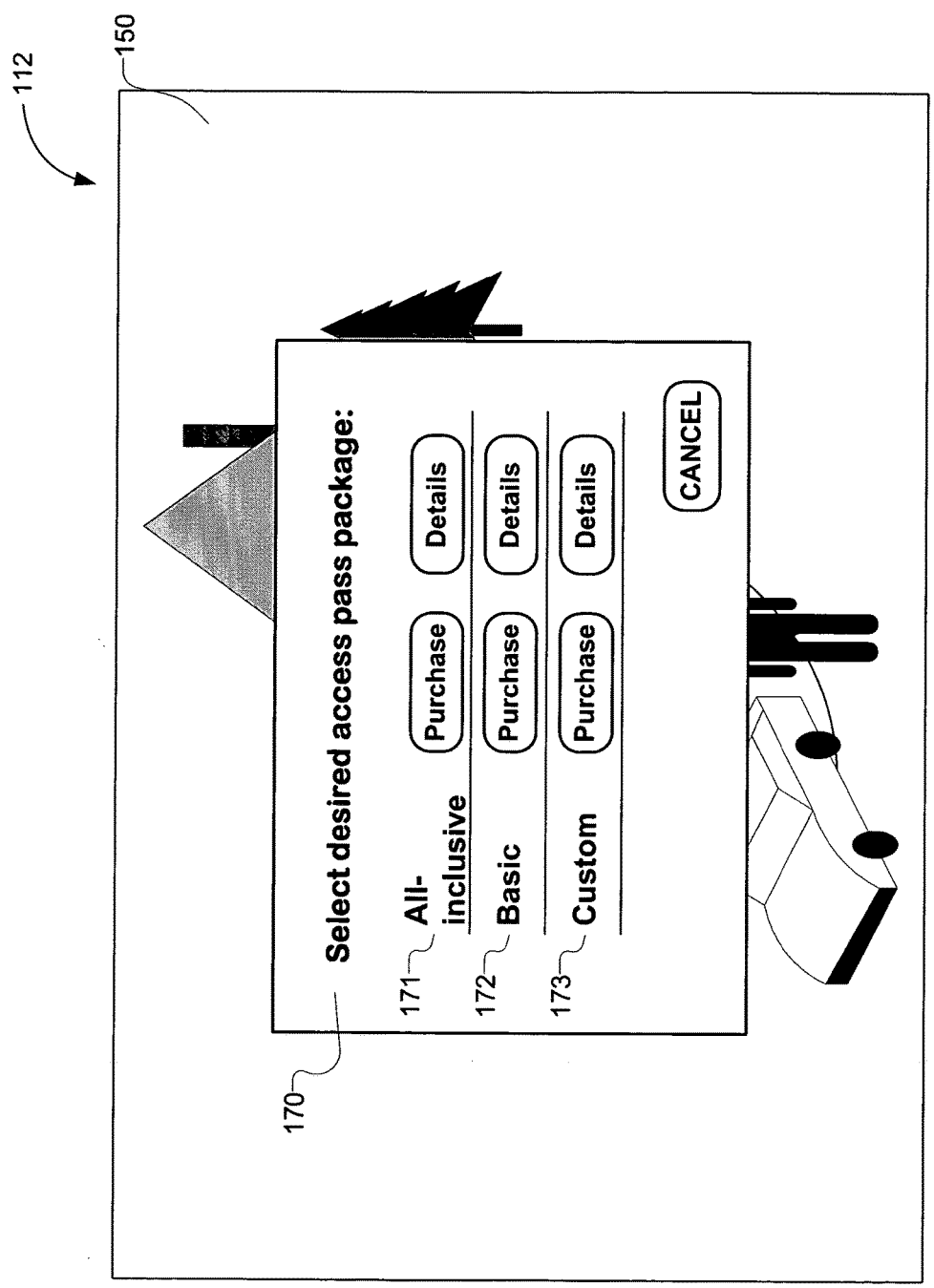
FIG. 7 illustrates an exemplary GUI that may be used to provide a user with different levels of access to enhanced content, according to an embodiment.

In certain embodiments, the user may choose to purchase different types of access passes. For example, FIG. 7 illustrates a GUI 170 that may be used to provide a user with different levels of access to enhanced content. As shown in FIG. 7, the user may purchase an all-inclusive access pass 171 and receive unlimited access to all available enhanced content related to a particular media content instance. Alternatively, the user may purchase a basic access pass 172 and receive access to a limited amount of enhanced content. Alternatively, as will be described in more detail below, the user may purchase a custom access pass 173. The access pass purchasing options shown in FIG. 7 are merely illustrative of the many different types of access pass purchasing options that may be available to a user. It will be recognized that additional or alternative purchasing options may be presented to a user as may serve a particular application.

Figure 8:
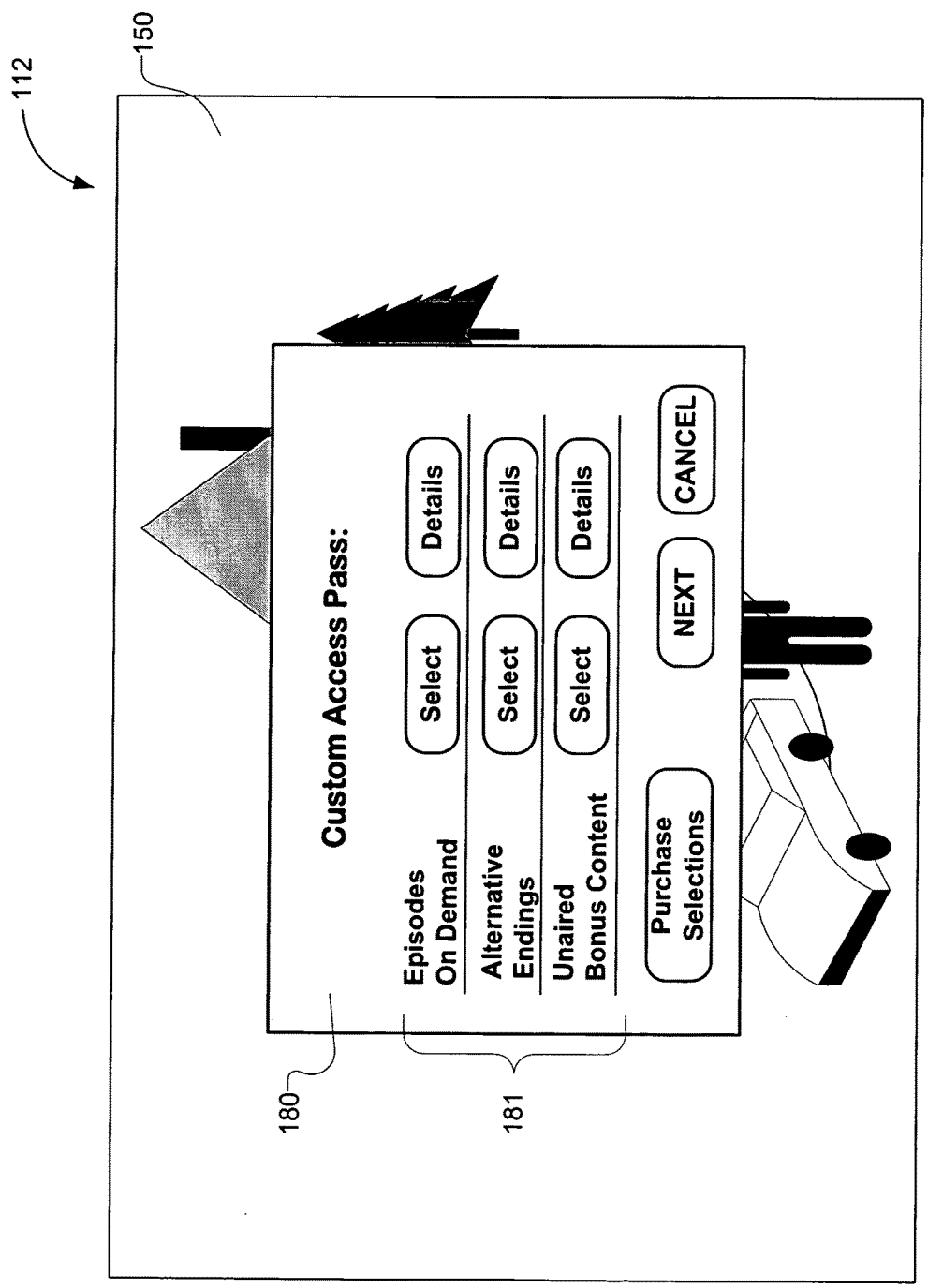
FIG. 8 illustrates an exemplary GUI that may be used to facilitate the purchase of a customized amount of enhanced content by the user, according to an embodiment.

FIG. 8 illustrates an exemplary GUI 180 that may be used to facilitate the purchase of a customized amount and/or type of enhanced content by the user. As shown in FIG. 8, the GUI 180 may show a listing 181 of the available enhanced content related to a particular media content instance. The GUI 180 may also include, but is not limited to, a description of each of the available instances of enhanced content, pricing information, and/or any other information as may serve a particular application.

The user may select one or more specific instances of the listed enhanced content 181 for purchase. For example, the user may select the "episodes on demand" option if he or she desires to view only additional episodes related to the media content instance. In this manner, the user may purchase access to only those instances of enhanced content in which he or she is interested.

Figure 9:
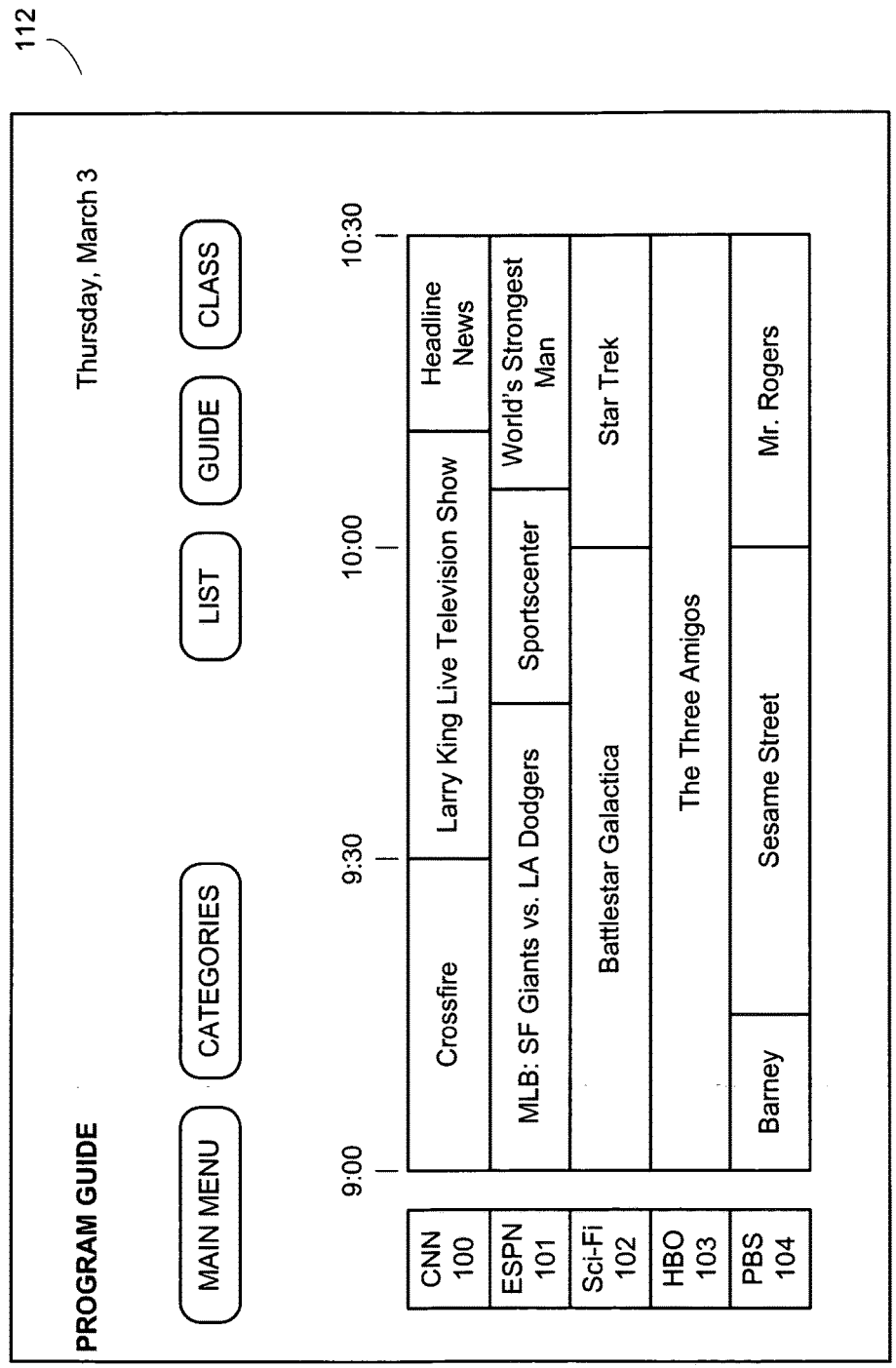
FIG. 9 illustrates an exemplary program guide GUI that may be displayed by the display device, according to an embodiment.

In certain embodiments, the user may purchase an access pass to enhanced content that corresponds to any media content instance that is listed in a program guide, regardless of the scheduled broadcast time of the media content instance. FIG. 9 illustrates an exemplary program guide GUI 190 that may be displayed by the display device 112. The program guide GUI 190 assists the user in navigating to, and between, various carriers of media content. As shown in FIG. 9, the program guide GUI 190 may be displayed in a grid-like style with a number of blocks of program information corresponding to media content shown on a number of carriers. For example, the program guide 190 shows program information corresponding to media content instances being broadcast or shown between 9:00 and 10:30 on carriers identified by channel numbers "100"-"104."

As is well known, the user may scroll up or down to display program information corresponding to carriers not currently shown on the program guide 190. For example, the program guide 190 currently shows program information for each of the carriers 100 through 104. If the user desires to see program information for carrier 105 (not shown), he or she may scroll down until the program information is displayed for carrier 105. Furthermore, the user may scroll backwards and forwards in time to view program information at times not currently being displayed.

Figure 10:
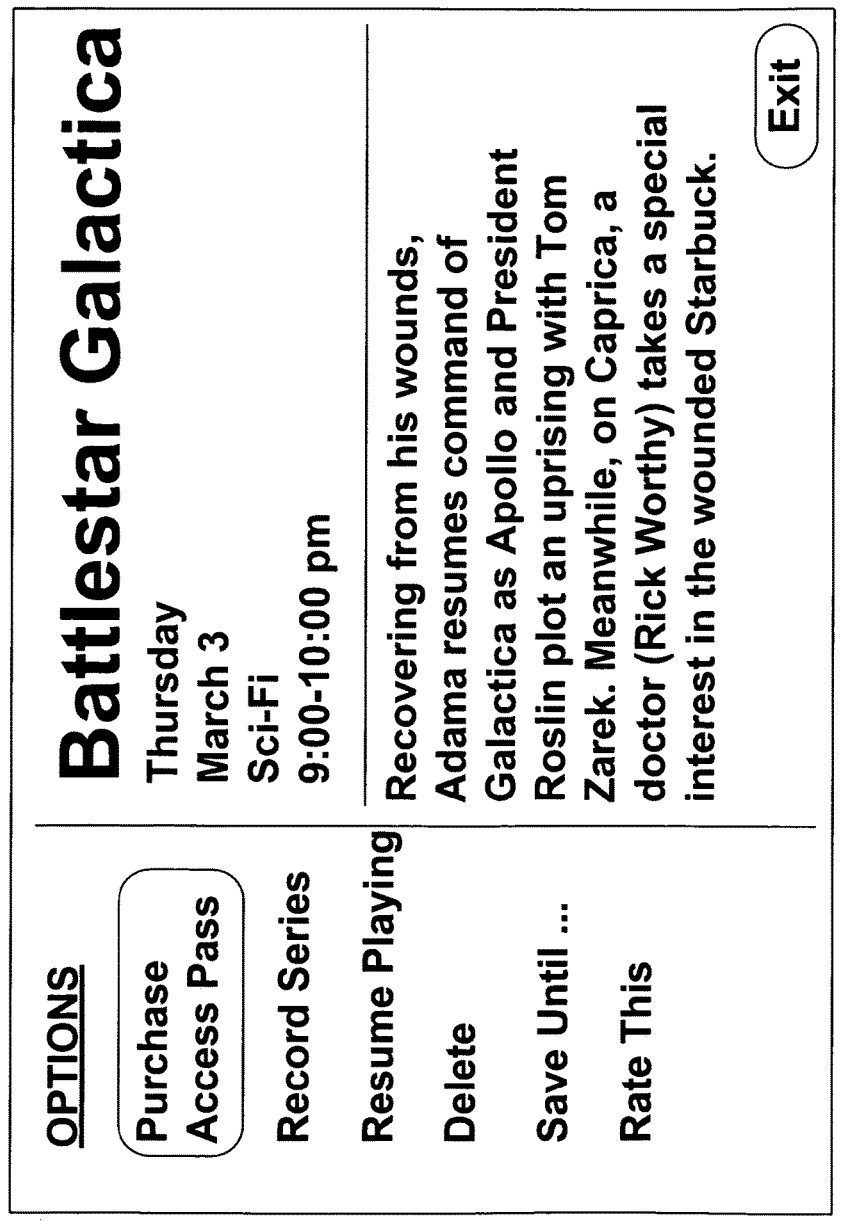
FIG. 10 illustrates an exemplary GUI that may be displayed when a media content instance is selected from the program guide GUI, according to an embodiment.

In some embodiments, the user may select one of the media content instances listed in the program guide 190 in order to purchase an access pass to enhanced content related to that media content instance. For example, the user may select "Battlestar Galactica" from the program guide 190 in order to purchase an access pass to enhanced content related thereto. FIG. 10 illustrates an exemplary GUI 200 that may be displayed when a media content instance (e.g., "Battlestar Galactica") is selected from the program guide 190. The GUI 200 is configured to provide the user with a number of options 201 related to the selected media content instance. As shown in FIG. 10, one of the options 201 may include an option to purchase an access pass to enhanced content related to the selected media content instance. In this manner, the user may purchase an access pass corresponding to any media content instance that is shown in the program guide 190, regardless of the scheduled broadcast time of the media content instance.

When the user inputs a command to purchase an access pass to enhanced content that corresponds to a particular media content instance, the processing subsystem 110 may be configured to transmit a request to the media content provider server 121 or some other location on the network 120 to purchase the access pass. The media content provider server 121 may then process the request and charge a subscription account associated with the user with the amount of the purchase. It will be recognized that other methods of payment may additionally or alternatively be used, including, but not limited to, credit card payments, payments by telephone, payments via the Internet, and payments by mail.

Once payment has been accepted, the network entity that receives the request for the media pass (e.g., the media content provider server 121) may transmit the purchased access pass to the processing subsystem 110. The user may then use the purchased access pass to access the enhanced content according to the privileges specified within the purchased access pass. For example, the access pass may include a key that allows the processing subsystem 110 to decrypt one or more instances of enhanced content.

Figure 11:
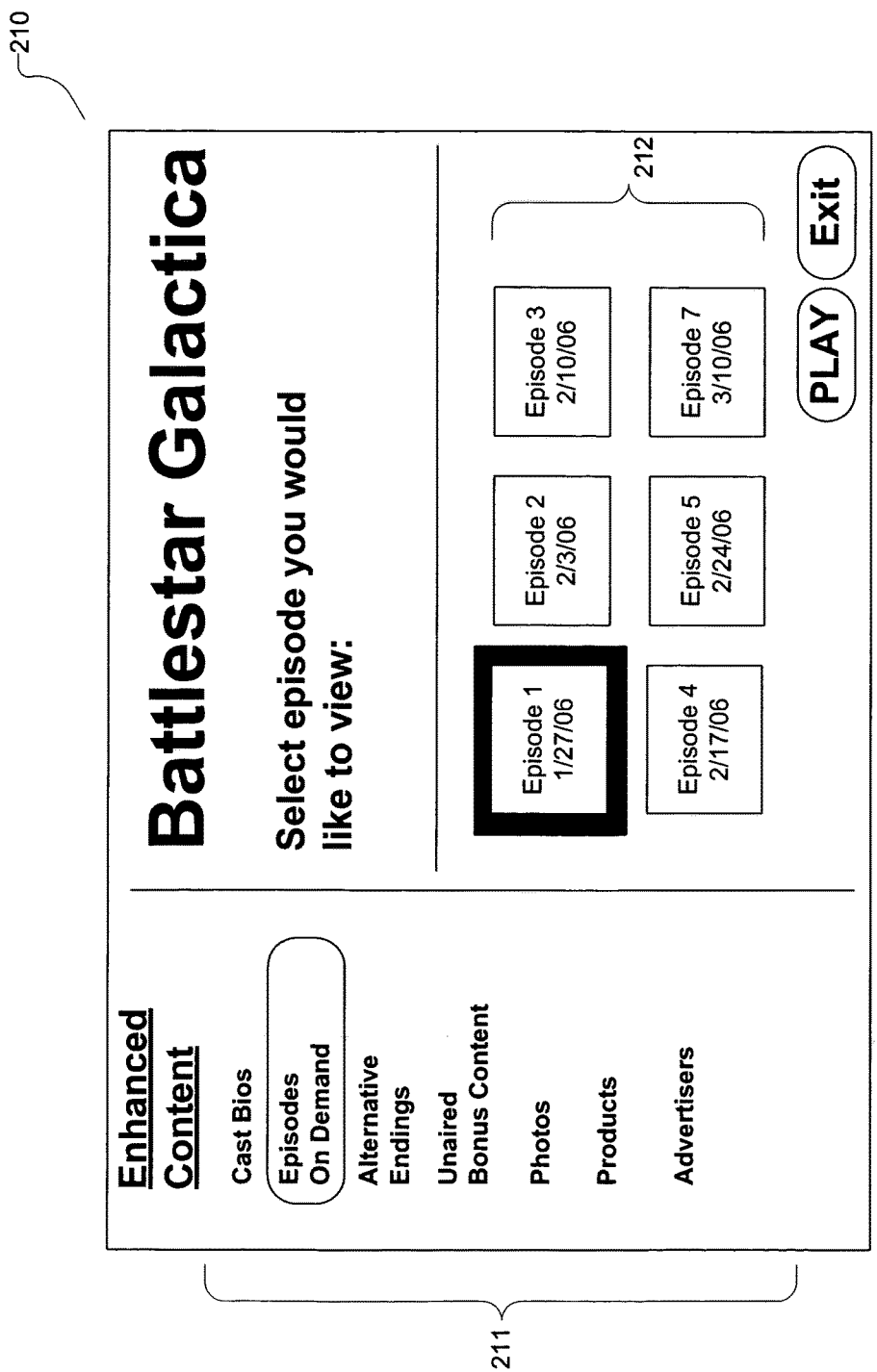
FIG. 11 shows an exemplary GUI that may be used to provide a user with access to enhanced content that has been purchased, according to an embodiment.

FIG. 11 shows a GUI 210 that may be used to provide a user with access to enhanced content that he or she has purchased. It will be recognized that a number of additional or alternative GUIs or other user interfaces may be used to provide a user with access to the enhanced content. The enhanced content options GUI 210 corresponds to the media content instance "Battlestar Galactica" for illustrative purposes. As shown in FIG. 11, a listing 211 of the available enhanced content may be displayed along with the title and other program information 212 corresponding to the media content instance. For example, the listing 211 may include, but is not limited to, cast biographies, episodes on demand, alternative endings, unaired bonus content, photographs, product information, and advertiser content.

The user may navigate through the list 211 of available enhanced content and select a particular instance of enhanced content for viewing. For example, as shown in FIG. 11, if the user selects "episodes on demand," the user may be presented with the option to select one or more of a number of related episodes (e.g., episode 1) for on-demand viewing. In certain embodiments, the related episodes may include episodes that have already aired and/or episodes that have yet to air to the general public.

In addition to accessing the enhanced content via the processing subsystem 110, a user may access the enhanced content via one or more of the additional access devices 114. For example, a user may access the enhanced content via a personal computer or mobile device that is configured to communicate with the processing subsystem 110 and/or network 120. In some examples, the option to access the enhanced content via one or more of the additional access devices 114 is included within one or more of the access pass packages available to the user for purchase.

In some examples, the enhanced content is permanently located at the media content provider server 121 or at some other location on the network 120. In this manner, the media content provider server operator may maintain a level of control over the enhanced content. Additionally or alternatively, the enhanced content may be at least partially downloaded to the processing subsystem 110 to facilitate faster access thereto, off-line access, and/or duplication of the enhanced content.

In certain embodiments, the media content provider server 121 or other network entity may periodically update the enhanced content with additional content that becomes available on the network 120 and/or media content provider server 121 over time. For example, the enhanced content may be updated on a daily or weekly basis. In this manner, the enhanced content may always include up-to-date data.

In some examples, a user preference database located at the processing subsystem 110, media content provider server 121, or at any other location stores some minimal information derived from the enhanced content that is accessed by a user. This information may include, for example, tracking information that may be used for historical, advertising, and learning purposes. For example, the tracking information may be used by one of the applications that are a part of the processing subsystem 110 to automatically recommend media content to the user. In some embodiments, the user may select an option that prevents the user preference database from recording such tracking information.

III. Exemplary Process View

Figure 12:
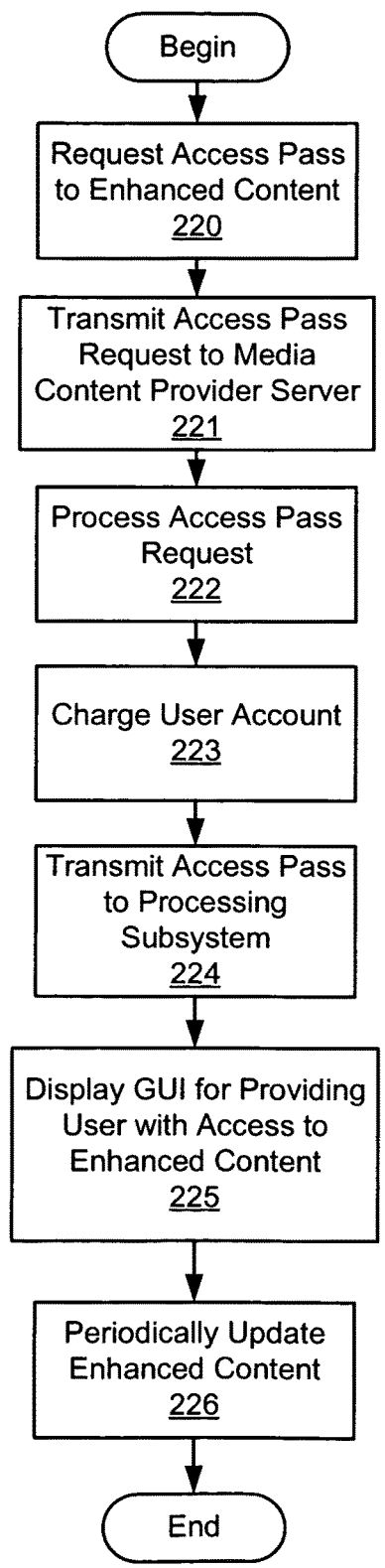
FIG. 12 illustrates an exemplary method of providing a user with access to enhanced content related to a media content instance, according to an embodiment.

FIG. 12 illustrates an exemplary method of providing a user with access to enhanced content related to a media content instance, according to an embodiment. While FIG. 12 illustrates exemplary steps according to one embodiment, other embodiments may omit, add to, reorder, and/or modify any of the steps shown in FIG. 12.

In step 220, a request to purchase an access pass to enhanced content is transmitted to the processing subsystem 110. The request may originate from any suitable input device 113. Alternatively, the request may originate from one or more of the additional access devices 114.

In step 221, the access pass request is transmitted to the media content provider server 121. The media content provider server 121 may then process the access pass request, as shown in step 222. It will be assumed for illustrative purposes only that the access pass request is processed by the media content provider server 121. It will be recognized that the access pass request may be processed by any other suitable entity on the network 120.

Once the access pass request has been processed, an account associated with the user may be charged with the purchase price of the access pass, as shown in step 223. Additional or alternative methods of payment may include, but are not limited to, credit card payments, payments by telephone, payments via the Internet, and payments by mail.

In step 224, the access pass is transmitted to the processing subsystem 110. The user may then use the access pass to access the enhanced content. For example, the access pass may include a key that allows the processing subsystem 110 to decrypt the enhanced content.

In step 225, one or more GUIs may be displayed by the display device 112 to provide a user with access to the enhanced content. The user may use the GUIs to browse through the available enhanced content and select one or more instances of enhanced content for viewing.

In step 226, the enhanced content is periodically updated with new content that becomes available on the network 120 or media content provider server 121. In this manner, the enhanced content may always include up-to-date data.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
   a network entity;
   a remote control user input device including an enhanced content access button configured to access a listing of at least three access levels associated with a particular scene or frame of a media content instance, each of the at least three access levels with a purchase option and a details option, associated with enhanced media content in response to a user pressing the enhanced content access button, at least a portion of the enhanced media content being for on-demand viewing; and a media content processing subsystem communicatively coupled to said network entity and said remote control user input device;

wherein when said access button is pressed the processing subsystem transmits to said network entity a request for a media content instance enhanced access pass that will provide access to enhanced content supplementing presentation of said media content instance that is selected by the user;

wherein said network entity generates a media content instance enhanced access pass in response to said request and transmits said media content instance enhanced access pass to said processing subsystem, said media content instance enhanced access pass corresponding to said media content instance and providing the user with access to said enhanced content via said processing subsystem.

2. The system of claim 1, wherein said media content processing subsystem is further configured to generate a program guide graphical user interface, wherein said media content instance is selected by the user from said program guide graphical user interface.

3. The system of claim 1, wherein said media content instance is selected by the user while said media content instance is being displayed by said media content processing subsystem.

4. The system of claim 1, wherein said network entity is further configured to periodically update said enhanced content.

5. The system of claim 1, wherein said media content instance enhanced access pass is further configured to provide one or more additional users with access to said enhanced content via said processing subsystem.

6. The system of claim 1, wherein said network entity is further configured to charge the user a purchase price for said access to said enhanced content.

7. The system of claim 1, wherein said media content instance enhanced access pass comprises a network cookie.

8. The system of claim 1, wherein said processing subsystem comprises at least one of a set-top box, home communication terminal, digital home communication terminal, stand-alone personal video recorder, video-enabled phone, and personal computer.

9. The system of claim 1, wherein said enhanced content comprises a video chat with cast of said media content instance.

10. The system of claim 1, wherein said processing subsystem is further configured to generate one or more graphical user interfaces that are configured to provide the user with access to said enhanced content.

11. The system of claim 1, further comprising:
one or more access devices configured to communicate with said network entity;
wherein said media content instance enhanced access pass is further configured to provide the user with access to said enhanced content via said one or more access devices.

12. An apparatus comprising:
a receiver facilitating access to a media content instance available for access without a media content instance enhanced access pass, receiving a request to access a listing of at least three access levels associated with a particular scene or frame of said media content instance, each of the at least three access levels with a purchase option and a details option, associated with enhanced content supplementing presentation of said media content instance in response to a user pressing an enhanced content access button on a user input device, and preventing said enhanced content from being available for access without receiving a media content instance enhanced access pass corresponding to said media content instance and based on said request facilitating access to said enhanced content, wherein said enhanced content comprises episodes related to said media content instance before they are broadcast to the public;

when the enhanced content access button is pressed, a communication interface unit transmitting data representative of said request to a network entity and receiving said media content instance enhanced access pass from said network entity; and a processor communicatively coupled to said communication interface and said receiver and generating one or more graphical user interfaces providing the user with access to said enhanced content.

13. The apparatus of claim 12, wherein said media content instance enhanced access pass comprises at least one of a data module and a network cookie.

14. A method comprising:
generating a request to access a listing of at least three access levels associated with a particular scene or frame of a media content instance, each of the at least three access levels with a purchase option and a details option, associated with enhanced content corresponding to a media content instance in response to a user pressing an enhanced content access button on a user input device;

transmitting said request to a network entity, said network entity being configured to process said request;

generating a media content instance enhanced access pass in response to said request, said media content instance enhanced access pass providing the user with access to said enhanced content, wherein said enhanced content comprises episodes related to said media content instance before they are broadcast to the public; and providing at least one additional user with access to said enhanced content via said media content instance enhanced access pass.

15. The method of claim 14, further comprising transmitting said media content instance enhanced access pass to said user terminal to provide the user with access to said enhanced content via said user terminal.

16. The method of claim 14, further comprising generating a program guide graphical user interface, wherein said media content instance is selected by the user from said program guide graphical user interface.

17. The method of claim 14, wherein said media content instance is selected by the user while said media content instance is being displayed by said user terminal.

18. The method of claim 14, further comprising generating one or more graphical user interfaces that are configured to provide the user with access to said enhanced content.

19. The method of claim 14, further comprising charging the user a purchase price for said media content instance enhanced access pass.

20. The method of claim 14, wherein said enhanced content comprises at least one of a video chat with a person involved in said production of said media content instance, a special offer for merchandise related to said media content instance, and a discussion forum related to said media content instance.

21. The system of claim 1, wherein said enhanced content comprises a discussion forum related to said media content instance.

22. The method of claim 14, further comprising transmitting said media content instance enhanced access pass to said at least one additional user terminal to provide the at least one additional user with access to said enhanced content via said at least one additional user terminal.

23. The system of claim 1, wherein said listing of at least three access levels includes each of an unlimited access level, a basic access level and a custom access level,
wherein said unlimited access level providing access to all available enhanced content related to the media content instance, said basic access level providing access to a portion of the enhanced content related to the media content instance, and said custom access level providing access to a user-selected subset of the enhanced content related to the media content instance.

24. The apparatus of claim 12, the processor further generating a graphical user interface providing a plurality of instances of enhanced content for purchase, and receiving at least one selection of said plurality of instances of enhanced content to be utilized as one of a plurality of levels of enhanced content.

25. The system of claim 1, wherein said enhanced content comprises a special offer for merchandise related to said media content instance.

26. The apparatus of claim 12, wherein said enhanced content comprises a discussion forum related to said media content instance.

27. The system of claim 1, wherein said enhanced content comprises new episodes related to the media content instance before they are broadcast to the public.

28. The system of claim 1, wherein said network entity processing of the request includes charging an account associated to the user a purchase price for the media content instance enhanced access pass.

29. The system of claim 1, wherein the media content instance that is selected by a user is the media content currently being displayed by said media content processing subsystem.

* * * * *